United States Patent
Robertson et al.

(10) Patent No.: US 6,518,542 B1
(45) Date of Patent: Feb. 11, 2003

(54) COLORED PATCH LASER MARKING

(75) Inventors: John A. Robertson, Chillicothe, OH (US); Ken R. Vaughn, Kingston, OH (US); Christopher D. Speakman, Greenfield, OH (US); Edward S. O'Neal, Rockbridge, OH (US)

(73) Assignee: Infosight Corporation, Chillicothe, OH (US)

( * ) Notice: Subject to any disclaimer, the term of this patent is extended or adjusted under 35 U.S.C. 154(b) by 0 days.

(21) Appl. No.: 09/975,166

(22) Filed: Oct. 11, 2001

(51) Int. Cl.[7] ............................................... B23K 26/00
(52) U.S. Cl. ................................................ 219/121.69
(58) Field of Search ...................... 219/121.6, 121.68, 219/121.69, 121.78, 121.8, 121.85

(56) References Cited

U.S. PATENT DOCUMENTS 4,514,456 A * 4/1985 Deal et al.
5,817,243 A * 10/1998 Shaffer
6,007,929 A * 12/1999 Robertson et al.

* cited by examiner

Primary Examiner—Samuel M. Heinrich
(74) Attorney, Agent, or Firm—Mueller and Smith, LPA

(57) ABSTRACT

Method for identifying an object having a surface of a given color associates a colored zone with the surface of the object. The zone is machine readably contrasting in color compared to the surface color. The colored zone is ablatively imaging to produce one or more of machine readable images, human readable images, or graphics. The contrast in color between the colored zone and the surface is machine readable. Advantageously, at least two colored zones are associated with the object to be identified. One or more of these colored zones can be ablatively marked. One or more of these colored zones also can be used to sort and/or identify the object by color.

20 Claims, 1 Drawing Sheet

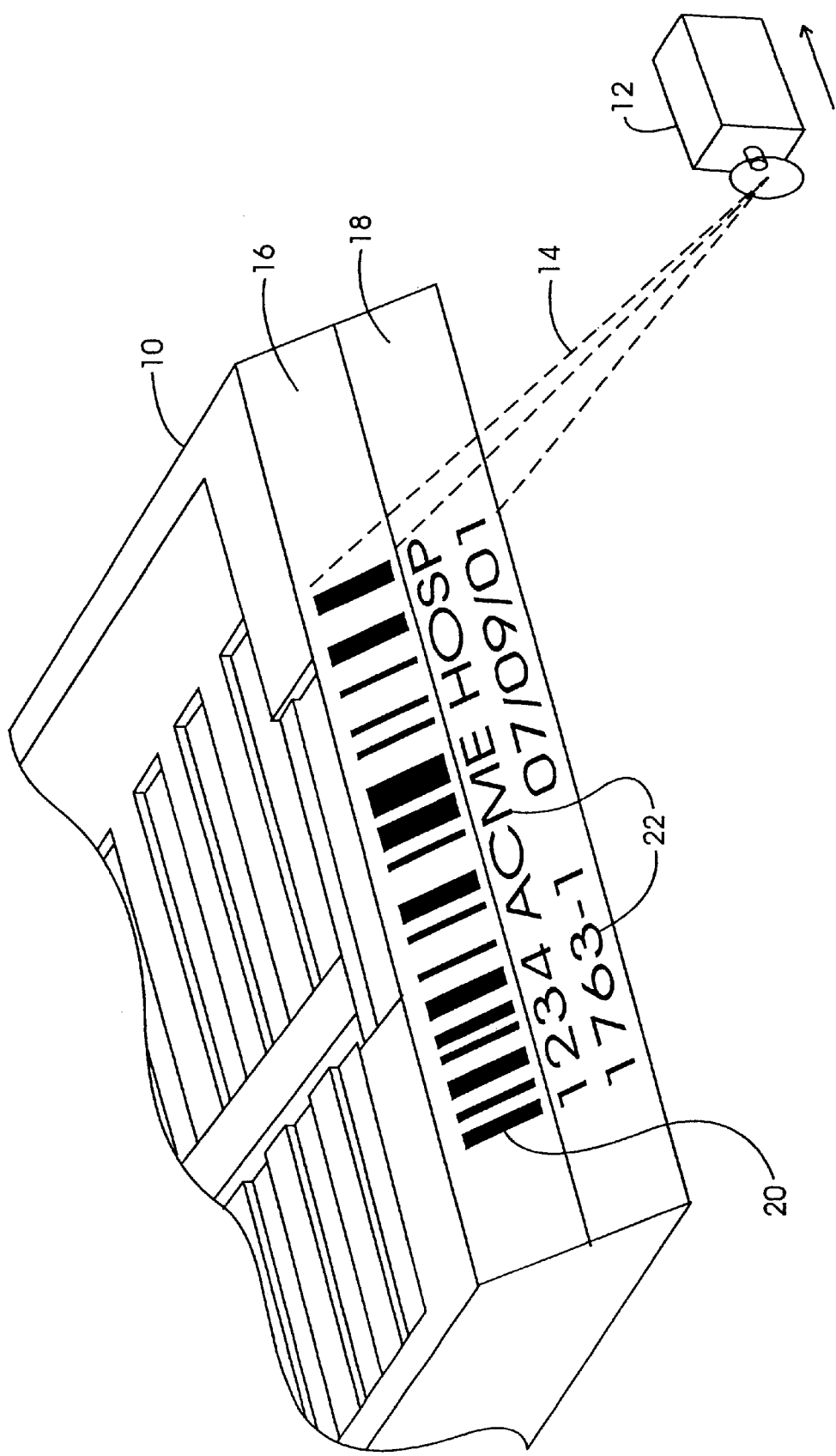

COLORED PATCH LASER MARKING

CROSS REFERENCE TO RELATED APPLICATIONS

None

STATEMENT REGARDING FEDERALLY SPONSORED RESEARCH

Not applicable.

BACKGROUND OF THE INVENTION

The present invention relates generally to product identification and more particularly to laser bar coding of products, such as biopsy cassettes.

There is an identified need for an identifying mark (e.g., bar code) on cassettes commonly used in biopsies (histology). Marking to identify the source of the tissue sample borne by the cassette historically has been done manually with a marking pen or by thermal transfer foil/articulated heat scribed (Triangle Biomedical Services, Durham, N.C.). Neither the manual pen nor the scribe can mark accurate bar codes.

Conceptually, a laser may mark the cassette. Unfortunately, direct laser marking (to an acceptable black) of the typical unmodified cassette material (e.g., DELRIN® brand of a linear polyoxymethylene-type acetal resin, E.I. du Pont de Nemours and Company, Wilmington, Del.) requires a short wavelength laser (e.g., NdYAG laser @ $1.06\mu$ wavelength), which is far more expensive than an equal powered $CO_2$ laser (@ $10.6\mu$ wavelength) and beyond the financial resources of the typical histology laboratory. Conceivably, the cassette material might be modified in such a way as to enhance direct laser marking contrast (see, for example, U.S. Pat. No. 5,977,514) when using a lower cost $CO_2$ laser, but this may affect its molding and chemical survival characteristics and would significantly increase the cost of each cassette.

As tissue sample traceability and automation become increasingly important, there is a need for economically and reliably creating bar codes on low cost cassettes, e.g., which cassettes can be marked by low cost ($CO_2$ laser) markers without requiring markability enhancing additives.

BRIEF DESCRIPTION OF THE DRAWING

The drawing is a perspective view showing the marking of a tissue sample cassette by a raster scanning laser. The drawing will be described in more detail below.

BRIEF SUMMARY OF THE INVENTION

Method for identifying an object having a surface of a first color associates a patch of a second color with the surface of the object to form a colored zone. The colored zone is machine readably contrasting in color compared to the surface first color. The colored zone is ablatively imaging to produce one or more of machine readable images, human readable images, or graphics. The contrast in color between the colored zone and the surface first color is machine readable.

Advantageously, at least two colored zones are associated with the object to be identified. One or more of these colored zones can be ablatively marked. One or more of these colored zones also can be- used to sort and/or identify the object by color.

Advantages of the present invention include the ability to reliably and cost effectively mark objects using a low cost $CO_2$ laser. Another advantage is the ability to mark tissue cassettes with computer and human readable characters. A further advantage is the ability to color code objects, such as tissue cassettes, with both color and computer readable indicia. These and other advantages will be readily apparent to those based on the disclosure set forth herein.

DETAILED DESCRIPTION OF THE INVENTION

To obtain the desired contrast for bar codes without doping the cassette material (e.g., DERLIN brand of a linear polyoxymethylene-type acetal resin), a thin patch or area of colorant (e.g., bar code scanner "black") can be applied as a zone atop the (typically, white) DELRIN cassette material or, alternatively, a thin patch or area of colorant (e.g., bar code scanner "white") can be applied as a zone atop the (typically, black) DELRIN cassette material. This patch, then, can be selectively ablatively removed by the programmably deflected focused laser beam to create the desired black/white indicia. When a black patch is used atop a white cassette, the laser leaves the bar code elements untouched.

An important constraint to address in cassette identification is that the indicia must survive the rigors of laboratory cassette processing. At a minimum, the markings must survive, while providing sufficient barcode print contrast signal (PCS): (1) alcohols, (2) xylene, (3) formaldehyde, and (4) handling abrasion (i.e., the patch must adhere well to DELRIN and DELRIN-like plastics. Additionally, the markings must survive extended archive storage of at least about 10 years.

The heat transfer foil of Triangle Biomedical Services can be laser ablated to produce the desired markings or indicia. Alternatively, a contrasting color paint or coating can be applied to white DELRIN or other white plastic cassettes. For optimum PCS, the patch should be black in color for application to white plastic. One such coating can be a black pigmented acrylic/maleic resin cut in alcohol and glycol ether solvents. The resulting patch adheres well to DELRIN and is resistant to xylene, formaldehyde, and alcohols.

On occasion it may be desirable to overcoat the marked zone with a clear coating. Such clear coating may have better solvent or chemical resistance, thereby protecting the underlying marked dye patch. Such clear coating also may improve the scratch resistance of the thin color patch layer. The color patch for marking, then, would only need to have adhesion to the cassette material and the clear overcoat and be laser markable.

An alternative to the foregoing laser patch marking system, color coding may be applied to the objects being identified. In the histology tissue sample cassette arena, for example, a laboratory may serve numerous hospitals and clinics. Molding cassettes from different color resins for each hospital is one way to aid in source identification at the laboratory. This presupposes, however, that hospitals can afford to custom order special colors of cassettes.

Using the laser patch marking system enables the laboratory to mark the cassettes for both machine and human readability. To aid in quickly identifying origin of the cassettes, however, two or more colored patches (say, N patches) can be applied to the cassettes. One or more of these colored patches may be laser etched for marking as described above. Such laser etched patch, then, can be used to glint machine readable data. The other colored patches can indicate other indicia about the cassettes and slides that they house. For example, one of the colors can indicate the hospital that originated the cassette. Since the cassette has 4 sides, the foregoing color patches and laser marking system can be applied to one or more of the cassette sides as additional identifying indicia.

The foregoing systems are illustrated in the drawing, which depicts a tissue sample cassette, 10, being marked by a laser marking system, 12, which will be described in more detail below with reference to U.S. Pat. No. 5,855,969. One of the sides of cassette 10 is oriented towards laser marking system 12 so that its beam, 14, may impinge thereon. Prior to such laser marking, the side oriented towards laser marking system 12, cassette 10, which may be made of DELRIN brand plastic can be coated with two different paints to form an upper horizontal coated zone, 16, and a lower horizontal coated zone, 18. Colored zone 16 is white in color if cassette 10 is made of black plastic and is black in color if cassette 10 is white in color. Colored zone 18 is an convenient color that can be used to represent, for example, the hospital that submitted cassette 10 to the laboratory for testing.

Colored zone 16 is conveniently marked with a computer scanable and readable bar code, 20. Colored zone 18 is marked with alphanumeric characters, 22, representing, for example, the name of the hospital originating the tissue samples, the date, the patient number, and other indicia that is human readable. Between colored zones 16 and 18, all of the information necessary to identify the cassette and its contents can be marked in both computer and human readable characters. Moreover, colored zone 18 additionally serves as a sorting and/or identifying indicium by dint of its color to aid workers, for example, in sorting a multiple of such cassettes. Such colored zones could be contained on other sides of cassette 10 as is necessary, desirable, and/or convenient.

Referring now to the details of the laser marking system (laser marking system 12), reference is made to U.S. Pat. No. 5,855,969 and the laser marking system disclosed therein. Such system preferably is used for objects in accordance with the precepts of the present invention, such as histology sample cassettes; although, any laser marking system may be used. Conventional marking systems have employed bi-directional laser scanning systems employing X-axis and Y-axis galvanometers so that the separate mirrors can scan both in the X and the Y axis. Such dual galvanometers systems and their associated "flat field" lenses are very expensive. U.S. Pat. No. 5,855,969, however, laser marks a coating employing but a one-axis (Y-axis) marker ($CO_2$ laser) with bidirectional mirror scanning. The scanning angle can be reduced to coincide with the indicia being created; thus, skipping over blank areas to speed up the marking process. Next, either the optics of the laser scanning system or the layer of coating on a substrate or tag can move along a single axis (X-axis). This relative movement creates an effective X-axis/Y-axis marking system with but a single mirror for the $CO_2$ laser. Moreover, the X-axis can fast step over zones which do not require marking; again, speeding up the marking process. Of course, the Y-axis scan and the X-axis stepping are in registry for creating the desired indicia on the coating being marked. Such indicia can be an alphanumeric character in any desired language, a graphic, or combinations; or can be a computer readable (e.g., picket fence) bar code.

The laser beam is scanned in one direction only (Y-axis or Y direction) while the relative motion of the surface to be marked and/or the laser optics provides X-axis or X direction effective movement of the surface to be marked. Scanning in one direction only greatly reduces the cost of the galvanometer system compared to an X/Y two galvanometer plus flat field lens system which can position a focused beam over a relatively large area. Raster scanning, although slower for typical patterns, also permits the marking of long objects (such as, for example, large bar code tags) without error prone jogging and splicing with the marked image (bar code); although, the speed of the X direction (stepping) can be accelerated over blank areas (areas not to be marked) which does increase the overall speed of the marking cycle. The scanning angle, Y scanning, also can be varied as is appropriate for the marked height which also increases the overall speed of the laser scan. For cost and efficiency, the laser of choice is a $CO_2$ laser because sealed units with long (>10,000 operating hours) lives are available commercially.

The stepping action advances the object a distance per step of, for example, 0.003 in (0.075 mm). Marking (e.g., of a nominal 0.003 in wide line) is done while the galvanometer deflected beam traverses in the Y direction over the unmarked zone while the object is advanced under the fixed beam scan line.

While the invention has been described with reference to a preferred embodiment, those skilled in the art will understand that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. In this application all units are in the metric system and all amounts and percentages are by weight, unless otherwise expressly indicated. Also, all citations referred herein are expressly incorporated herein by reference.

What is claimed is:

1. Method for identifying an object having a surface of a first color, which comprises:
   (a) associating a patch of a second color with the surface of the object to form a colored zone on said object surface, wherein the second color is machine readably contrasting in color compared to the first color; and
   (b) ablatively imaging said colored zone to produce one or more of machine readable images, human readable images, or graphics,
wherein the contrast in color between said imaged colored zone and said surface first color is machine readable.

2. The method of claim 1, wherein said object is a tissue sample cassette.

3. The method of claim 2, wherein said cassette is made from an acetal resin.

4. The method of claim 1, wherein said second color is black and said surface first color is white.

5. The method of claim 1, wherein said second color is white and said surface first color is black.

6. The method of claim 1, wherein patch of second color comprises paint applied to said object surface to form said colored zone.

7. The method of claim 6, wherein said paint comprises an acrylic/maleic resin.

8. The method of claim 1, wherein said ablative imaging is done with a laser.

9. The method of claim 8, wherein said laser is a $CO_2$ laser.

10. The method of claim 8, wherein said laser is raster scanned to form said images.

11. Method for identifying an object having a surface of a first color, which comprises:
   (a) associating a plurality of colored patches with the surface of the object to form a plurality of colored zones, wherein at least one of said colored zones is machine readably contrasting in color compared to the surface first color; and
   (b) ablatively imaging at least one of said colored zones to produce one or more of machine readable images, human readable images, or graphics, wherein the contrast in color between said imaged colored zone and said surface first color is machine readable and said colored zones are used for identification.

12. The method of claim 11, wherein said object is a tissue sample cassette.

13. The method of claim 12, wherein said cassette is made from an acetal resin.

14. The method of claim 11, wherein said imaged colored zone is black and said surface first color is white.

15. The method of claim 11, wherein said imaged colored zone is white and said surface first color is black.

16. The method of claim 11, wherein said colored patches are formed from paints applied to said object surface to form said colored zones.

17. The method of claim 16, wherein said paints comprises an acrylic/maleic resin.

18. The method of claim 11, wherein said ablative imaging is done with a laser.

19. The method of claim 18, wherein said laser is a $CO_2$ laser.

20. The method of claim 19, wherein said laser is raster scanned to form said images.

* * * * *